United States Patent [19]

Reinhardt

[11] Patent Number: 5,778,169
[45] Date of Patent: Jul. 7, 1998

[54] COMPUTER SYSTEM HAVING IMPROVED REGRESSION TESTING

[75] Inventor: Tilman Reinhardt, Woodside, Calif.

[73] Assignee: Synopsys, Inc., Mountain View, Calif.

[21] Appl. No.: 511,905

[22] Filed: Aug. 7, 1995

[51] Int. Cl.⁶ .................................................. G06F 11/30
[52] U.S. Cl. ................ 395/183.14; 394/704; 394/183.11
[58] Field of Search .................. 395/183.14, 183.1, 395/183.11, 703, 704; 364/267–267.91

[56] References Cited

U.S. PATENT DOCUMENTS

| | | | |
|---|---|---|---|
| 4,636,940 | 1/1987 | Goodwin, Jr. | 395/704 |
| 4,853,851 | 8/1989 | Horsch | 395/183.14 |
| 5,050,168 | 9/1991 | Paterson | 395/183.11 |
| 5,103,394 | 4/1992 | Blasciak | 395/184.01 |
| 5,121,501 | 6/1992 | Baumgartner | 395/800 |
| 5,182,806 | 1/1993 | McKeeman et al. | 395/707 |
| 5,193,180 | 3/1993 | Hastings . | |
| 5,261,100 | 11/1993 | Fujinami et al. | 395/703 |
| 5,265,254 | 11/1993 | Blasciak et al. | 395/704 |
| 5,335,344 | 8/1994 | Hastings . | |
| 5,412,679 | 5/1995 | Owaki et al. | 372/45 |
| 5,450,586 | 9/1995 | Kuzara et al. | 395/704 |
| 5,454,086 | 9/1995 | Alpert et al. | 395/568 |

OTHER PUBLICATIONS

"Pure Software Ships Purify 3 & Purecoverage 1.0"; Jan. 1995; C/C++ Users' Journal, V13 N1 p. 101(1).

"Improving Software Quality Everywhere", by Pure Software, Inc., 1309 So. Mary Avenue, Sunnyvale, CA 94087.

*Primary Examiner*—Robert W. Beausoliel, Jr.
*Assistant Examiner*—P Vales

[57] ABSTRACT

A method of testing a computer program in a computer system is described. The computer system includes a source code corresponding to the computer program, and a number of tests. The method includes the following steps. A coverage point is inserted into the source code to correspond to a statement in the source code. An executable, corresponding to the source code, is executed using the tests. This generates a result. The result is used to generate a subset of tests that executed the coverage point and tested the statement. Test a second executable using the subset of tests. The second executable corresponds to the source code.

11 Claims, 5 Drawing Sheets

COMPUTER SYSTEM HAVING IMPROVED REGRESSION TESTING

BACKGROUND OF THE INVENTION

1. Field of Invention

The present invention relates to the field of testing in computer systems. In particular, the present invention describes a computer system having an improved regression testing tool for testing computer programs.

2. Description of the Related Art

An important aspect of the computer program development process is regression testing. The following definitions provide a foundation for understanding regression testing:

A computer program is a series of instructions to be executed by a computer to obtain a result.

A statement includes instructions to the computer. The statement can be a single line:

$x=y+1$

Add R1, R2, R3

The statement can include other statements, such as an if statement, a loop, a function, or a procedure:

```
if(x>y)
    r=m+n
    else...
OR
for(i<k, i++)
{
    r=2 * s + 2 * w
    ...
}
```

The source code includes a number of statements that can be run as a computer program. The source code is usually what the programmer enters as a program.

The executable includes instructions the computer executes directly, such as object code, or a series of statements in an interpreted language, such as Basic (in this case, the source code and the executable are essentially the same).

Regression testing involves providing a program with many different tests. The tests provide the program with different input. These tests exercise the specific functions, data structures, and features of the program. To perform regression testing, a computer executes the program a number of times. Each execution uses a different one of the regression tests as input. The regression test results indicate which of the tests passed and which failed.

Different programmers modify different parts of the source code during the program development. Typically, the programmer compiles the program with just his/her changes. Before the programmer releases the changes, the programmer performs a number of tests on the changes. (The programmer "releases" changes by allowing others in the development team to use the changed source code.) Ideally, the testing includes running the regression tests on the newly compiled program. The regression testing shows whether those changes cause some of the regression tests to fail.

One problem with requiring a programmer to run the regression tests, when a change is made, is that regression testing may take hours or even days. The regression tests can include thousands of tests. Importantly, any one source code change may only be tested by a small percentage of the regression tests. For example, only one hundred tests out of eight thousand may exercise a particular statement in the source code. Therefore, if the programmer changes a particular statement, performing a complete regression test is prohibitively time consuming.

Ideally, the programmer would know which of the regression tests would test a particular statement. However, this is not always the case. Regression test libraries can be built up over months or years. The information about what is tested by them can be lost or may not be updated. Additionally, the volume of tests makes knowing which tests test which statements very difficult. The tests may be unsorted or unclassified as to which part of the program they test. Even tests that are well understood will typically test other parts of the program than the target area. Therefore, it is very difficult for a programmer to know which of the regression tests will test a particular part of the program.

Pure Software, Inc., of Sunnyvale, Calif., U.S.A., makes the PureCoverage™ tool, a code coverage tool. The PureCoverage tool uses the object code of a program to indicate which parts of the program have been tested by a specific test (the object code coverage data). From the object code coverage data, the PureCoverage tool can show whether a particular source code statement was tested. However, the PureCoverage tool uses object code insertion (see U.S. Pat. No. 5,335,344 and U.S. Pat. No. 5,193,180). Object code insertion involves expanding the object code, by inserting new instructions and data between preexisting instructions and data of the object code, without recompiling the source code.

The PureCoverage Tool has a number of disadvantages. First, the PureCoverage tool performs time consuming post processing on the object code to obtain the object code coverage information. Second, the PureCoverage tool does not easily support programs that undergo two or more processing steps, before reaching executable object code. For example, a VHDL circuit description may first be translated into a C program before being compiled into object code. The PureCoverage tool could provide coverage information for the C, but the circuit designer ideally wants information about the VHDL circuit description, not the generated C. Third, the PureCoverage tool processes the entire object code, or at least large portions of it, when a programmer may be interested in a very small part of the source code. Fourth, the PureCoverage tool generates large amounts of object code coverage information. A programmer must sort through this large amount of data to determine which tests test which statements of interest. Fifth, the PureCoverage tool apparently provides only the object code coverage data. The object code coverage data is apparently not correlated with the tests of the regression testing. Therefore, PureCoverage does not easily permit a programmer to select a subset of tests that exercise a particular statement.

Therefore, it is desirable to have a tool that uses the source code to generate test coverage information, rather than post processing the object code. The tool should be flexible enough to allow a programmer to obtain coverage information for small portions of the source code in which the programmer is interested. The tool should generate a minimal amount of coverage information. The tool should be well integrated into the regression testing environment, allowing programmers to easily identify and run regression tests that test their source code changes.

SUMMARY OF THE INVENTION

A method of testing a computer program in a computer system is described. The computer system includes a source code corresponding to the computer program, and a number of tests. The method includes the following steps. A coverage point is inserted into the source code to correspond to a statement in the source code. An executable, corresponding to the source code, is executed using the tests. This generates a result. The result is used to generate a subset of tests that executed the coverage point and tested the statement. Test a second executable using the subset of tests. The second executable corresponds to the source code.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

Overview of One Embodiment of the Present Invention

A regression testing tool for use in a computer system is described. In the following description, specific details are set forth such as code examples for scripts to access and manipulate test coverage report information, etc., in order to provide a thorough understanding of the present invention. In other instances, known circuits, structures and techniques have not been shown in detail in order not to obscure the present invention.

In one embodiment, a set of regression tests are run on an executable. The executable is compiled from source code that includes coverage points. During the regression testing, the coverage points are executed along with statements that follow the coverage points. The coverage points output identifying information when they are executed. The identifying information is correlated with the names of the tests that are run during the regression testing. A programmer can modify the statements following the coverage point. A programmer can use a test coverage tool to identify a subset of the tests that executed a coverage point(s) corresponding to the modified statements. The programmer saves a significant amount of development time because the programmer can now run the subset of tests on an executable, compiled from the source code including the modified statements, and does not have to run the complete set of regression tests.

A Computer System

Figure 1:
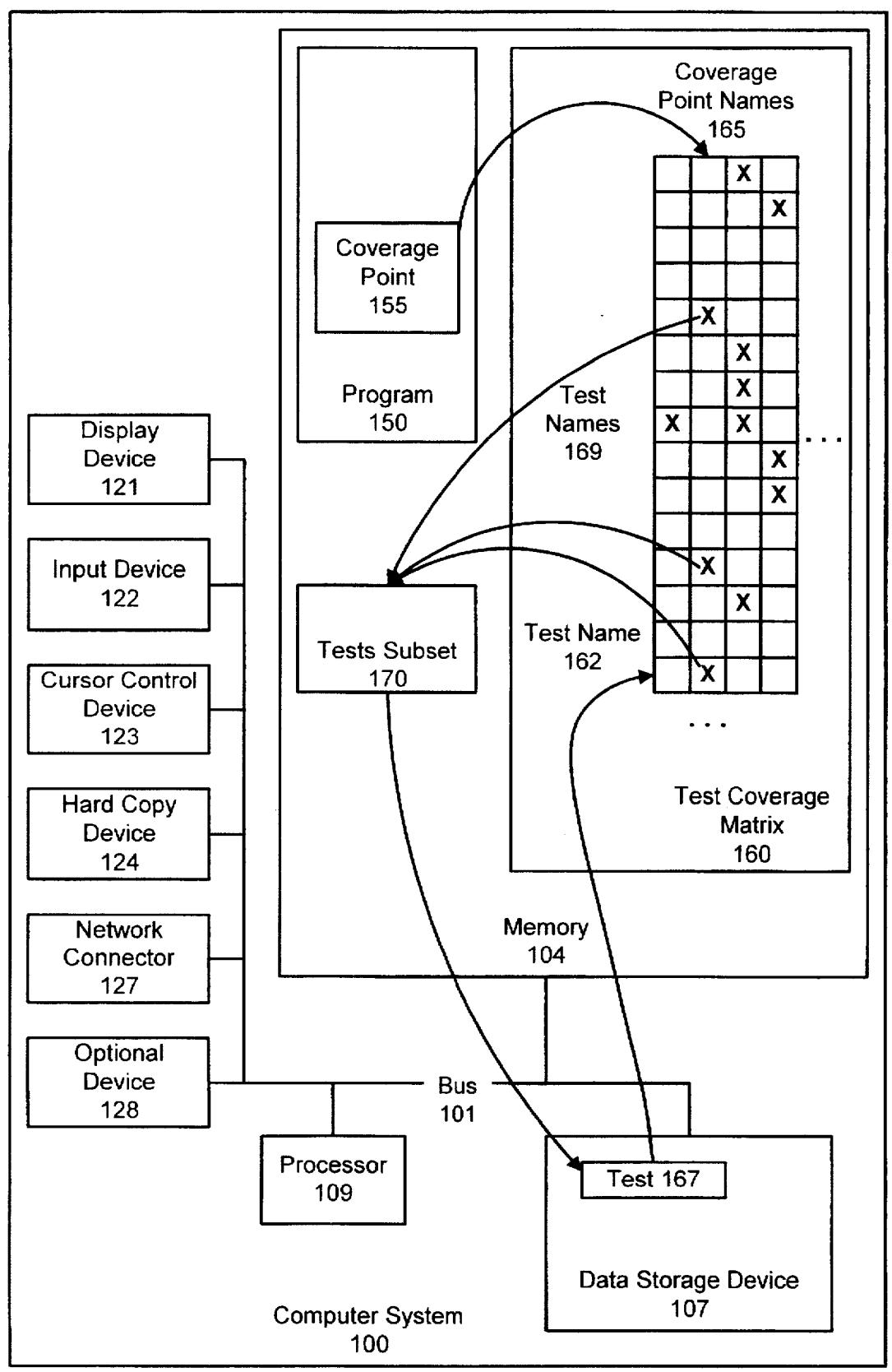
FIG. 1 illustrates an embodiment of a computer system having an improved regression testing tool.

FIG. 1 illustrates a computer system 100 upon which an embodiment of the invention can be implemented. Computer system 100 could be, for example, a Sun workstation from Sun Microsystems, Inc., of Mountain View, Calif., a Power Macintosh™ from Apple Computer, CA, or an IBM compatible. Computer system 100 can run any of a number of operating systems, such as UNIX™, the Mac OS™, Windows™, or DOS.

The computer system 100 includes a bus 101, or other communications hardware and software, for communicating information.

The computer system 100 has a processor 109, coupled with the bus 101, for processing information. The processor 109 can be a single processor or a number of individual processors that can work together.

The computer system 100 further includes a memory 104. The memory 104 can be random access memory (RAM), or some other dynamic storage device. The memory 104 is coupled to the bus 101 and is for storing information and instructions to be executed by the processor 109. The memory 104 also may be used for storing temporary variables or other intermediate information during the execution of instructions by the processor 109. The memory 104 can include a ROM (read only memory), and/or some other static storage device.

The computer system 100 can optionally include a data storage device 107, such as a magnetic disk, a digital tape system, or an optical disk and a corresponding disk drive. The data storage device 107 can be coupled to the bus 101.

The computer system 100 can also include a display device 121 for displaying information to a user. The display device 121 can be coupled to the bus 101. The display device 121 can include a frame buffer, specialized graphics rendering devices, a cathode ray tube (CRT), and/or a flat panel display. The bus 101 can include a separate bus for use by the display device 121 alone.

The computer system 100 can receive user input from a number of devices. An input device 122, typically including alphanumeric and other keys, is typically coupled to the bus 101 for communicating information, such as command selections, to the processor 109 from a user. Another type of user input device is a cursor control device 123, such as a mouse, a trackball, a pen, a touch screen, a touch pad, a digital tablet, or cursor direction keys, for communicating direction information to the processor 109, and for controlling the cursor's movement on the display device 121. The cursor control device 123 typically has two degrees of freedom, a first axis (e.g., x) and a second axis (e.g., y), which allows the cursor control device 123 to specify positions in a plane. However, the computer system 100 is not limited to input devices with only two degrees of freedom.

Another device that may be optionally coupled to the bus 101 is a hard copy device 124 that may be used for printing instructions, data, or other information, on a medium such as paper, film, slides, or other types of media.

In another embodiment, a computer system can be a number of networked computer system 100s. To achieve this, the computer system 100 can be part of a computer network (for example, a LAN) using an optional network connector 127, being coupled to the bus 101.

In on embodiment, the memory 104 includes a program 150. The program 150 includes a coverage point 155 associated with some portion of the program 150. That is, a coverage point 155 is a reference location in the program 150. When the program 150, including the coverage point 155, is executed, the coverage point 155 indicates whether that point in the program 150 has been executed. The coverage point 155 has a minimal effect on the execution of the program. (In one embodiment, the coverage point 155 may slow the execution of the program. However, before shipping the program to the customers, the compiler effectively removes the coverage points.) A programmer will insert a coverage point 155 near (in front, behind, or within) one or more statements of interest to that user. The coverage point 155, therefore, indicates whether those statements are executed.

The data storage device includes a test 167 used to test the program 150. When the processor 109 executes the program 150 using the test 167, the coverage point 155 results in an entry in the test coverage matrix 160. The test coverage matrix 160 includes a number of the coverage point names 165 and the test names 169. An entry in the matrix indicates whether that test exercised a particular part of the program 150. For example, the "X" associated with the test name 162 indicates using the test 167 as input to the program 150 causes the coverage point 155 to be executed.

From the test coverage matrix 160, a tests subset 170 can be generated. The tests subset 170 includes references to all the tests that executed one or more coverage points. For example, if the tests subset 170 is generated for the coverage point 155, then three tests, including the test 167, are referenced in the tests subset 170. Note, importantly, the tests subset 170 potentially references far fewer tests than make up the entire set of regression tests.

A Test Coverage Tool

Figure 2:
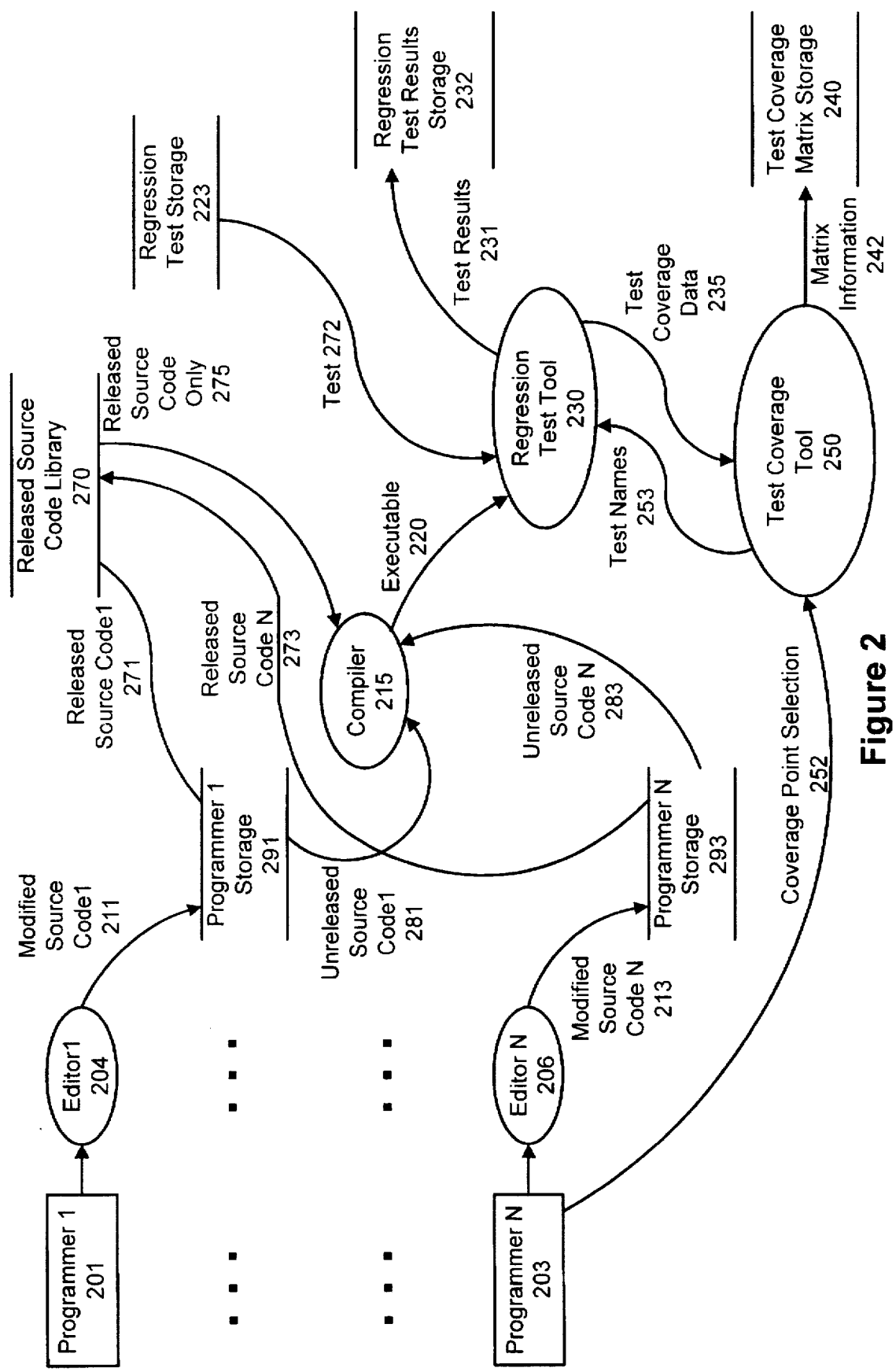
FIG. 2 illustrates a regression testing system.

FIG. 2 illustrates a computer system 100 having a test coverage tool 250. The test coverage tool 250 greatly reduces the program development time by greatly reducing the amount of time required to test a change in the source code of a program.

In this example, a number of programmers, programmer 1 201 through programmer N 203, work on the program 150 together. The word "programmer" is meant to include software engineers, users, quality assurance persons, hardware engineers, etc. Programmer is synonymous with user. The programmers use a number of text editors, the editor 1 204 through the editor N 206 to edit the source code. The editors run on the computer system 100.

Each of the programmers has a local source code storage, programmer 1 storage 291 through programmer N storage 293. These can be a local file directly on a file server. The programmer storage stores the modified source code, e.g. the modified source code 1 211 through the modified source code N 213. The modified source code represents the source code on which the programmer is working. A programmer releases his/her modified source code, allowing others to use it, by having the released source code library 270 store the released source code, e.g. the released source code 1 271 through the released source code N 273.

The source code can be a high level language such as C, C++, PASCAL, or FORTRAN. In another embodiment, the source code can be other languages, for example, assembler. In another embodiment, high level electronic circuit design languages can be used, for example, Verilog or VHDL.

A compiler 215 compiles all the source code to create an executable 220. The executable 220 can be compiled from the released source code only 275, or it can be compiled from the unreleased source code, e.g. the unreleased source code 1 281 through the unreleased source code N 283, or often a combination of both. The compiler 215 can be a standard C or C++ compiler, for example. The compiler 215 can be some other type of compiler such as a VHDL compiler. The compiler 215 can include a series of compilers. The compiler 215 runs on the computer system 100.

A regression test tool 230 executes the executable 220 using tests 272 as input. The regression test storage 223 stores the tests 272. The regression test storage can include data storage device 107. In one embodiment, the regression test tool 230 accesses the tests 272 using the path name of the tests. The regression test tool 230 could access the tests 272 using some other technique.

The regression test tool 230 generates the test results 231. The test results 231 are stored in the regression test results storage 232. The regression test results storage 232 can include data storage device 107. The test results 231 indicate whether a particular test passed or failed. A pass means that using the test as the input, the computer system 100 achieved the desired result of that test by executing the executable 220. A fail means that the desired result was not achieved. The test results 231 includes a list of pass or fail indications for the tests 272. For example, if the first test passes, the test results 231 includes the first test's name and that it passed. If the second test fails, the test results 231 includes the second test's name and that it failed.

Using the executable 220 compiled from the released source code only 275, the regression test tool 230 produces the test coverage data 235 for the test coverage tool 250. The test coverage tool 250 then generates the test coverage matrix 160 using the test coverage data 235. The test coverage tool 250 stores the matrix information 242, relating to the test coverage matrix 160, in the test coverage matrix storage 240. The test coverage matrix storage 240 can be included on the data storage device 107.

The following provides more information on the test coverage matrix 160. The test coverage matrix 160 includes the names of the tests 272, the coverage point names 165 that were used as input during the testing, and the relationship between the tests and the coverage points. The relationship can be that a particular test caused a particular coverage point to be executed or that a particular test did not cause a particular coverage point to be executed. The test coverage matrix 160 can also indicate that a particular test did not cause any of the coverage points to be executed.

The programmers use the test coverage tool 250 to view the test coverage matrix 160. The programmers can also supply the test coverage tool 250 with a coverage point selection 252. The test coverage tool 250 uses the matrix information 242 to determine the tests subset 170. The test coverage tool 250 provides the test names 253 of the tests subset 170 to the regression test tool 230. The regression test tool 230 can then run the executable 220, compiled from both the released source code only 275 and the unreleased source code, using only those tests that execute a given coverage point.

The following example illustrates a significant benefit of one embodiment of the invention. Assume the modified source code N 213 is as follows. The meaning of "COVERAGE_POINT('coverage_point_A')" will be discussed in relation to FIG. 3. For now, assume that "COVERAGE_POINT('coverage_point_A')," identifies a coverage point in the modified source code N 213.

```
...
if( x>y)
    COVERAGE_POINT("coverage_point_A");
    r = m+n;
else
...
```

Assume the programmer N 203 decides to change a statement in the modified source code N 213 as follows:

```
...
if( x>y)
{
```

-continued

```
    r = m+n;
    ...
    COVERAGE_POINT("coverage_point_A");
    m = function_call_xyz(n)
}
else
...
```

The compiler 215 can recompile the unreleased source code N 283 with the released source code only 275 to generate a new executable 220. However, the programmer N 203 must now test the changes before releasing the modified source code N 213 as the released source code N 273.

Remember, the regression test tool 230 normally runs thousands of regression tests. A complete regression test run can take hours. Therefore, as part of the standard development cycle, the regression test tool 230 runs the executable 220, compiled from the released source code only 275, but not any of the unreleased source code N 283, on a regular basis (e.g. nightly). The test results 231, as well as the test coverage data 235, are then generated nightly.

Using the test coverage data 235, from the nightly regression testing, the programmer N 203 can use the test coverage tool 250 to greatly reduce the number of tests in the tests 272. For example, the tests subset 170 may contain one hundred tests while the regression test storage 223 may contain eight thousand tests.

The programmer N 203 determines that the coverage_point_A must have been executed during the nightly regression testing. Therefore, the programmer N 203 supplies the test coverage tool 250 with the coverage point selection 252. The test coverage tool 250 accesses the test coverage matrix storage 240 for the matrix information 242 corresponding to the coverage point selection 252. That is, the test coverage tool 250 identifies all the test names 253 that execute the coverage_point_A. The test coverage tool then supplies the regression test tool 230 with the test names 253. The regression test tool 230 then executes the executable 220, compiled from the unreleased source code and the released source code only 275, against the tests 272 corresponding to only the test names 253.

The regression test tool 230 then produces the test results 231. However, the test results 231 contain considerably less data and requires considerably less time to be produced. The programmer N 203 can then determine whether the change to statement has resulted in any of the tests referenced by the tests subset 170 failing.

Importantly, the programmer N 203 knows that if all the regression tests in the regression test storage 223 are passing with the new executable 220, none of the tests that execute the modified statement will fail. Therefore, the programmer N 203 can release the unreleased source code N 283 for use in the released source code library 270.

Using a Test Coverage Tool

Figure 3A:
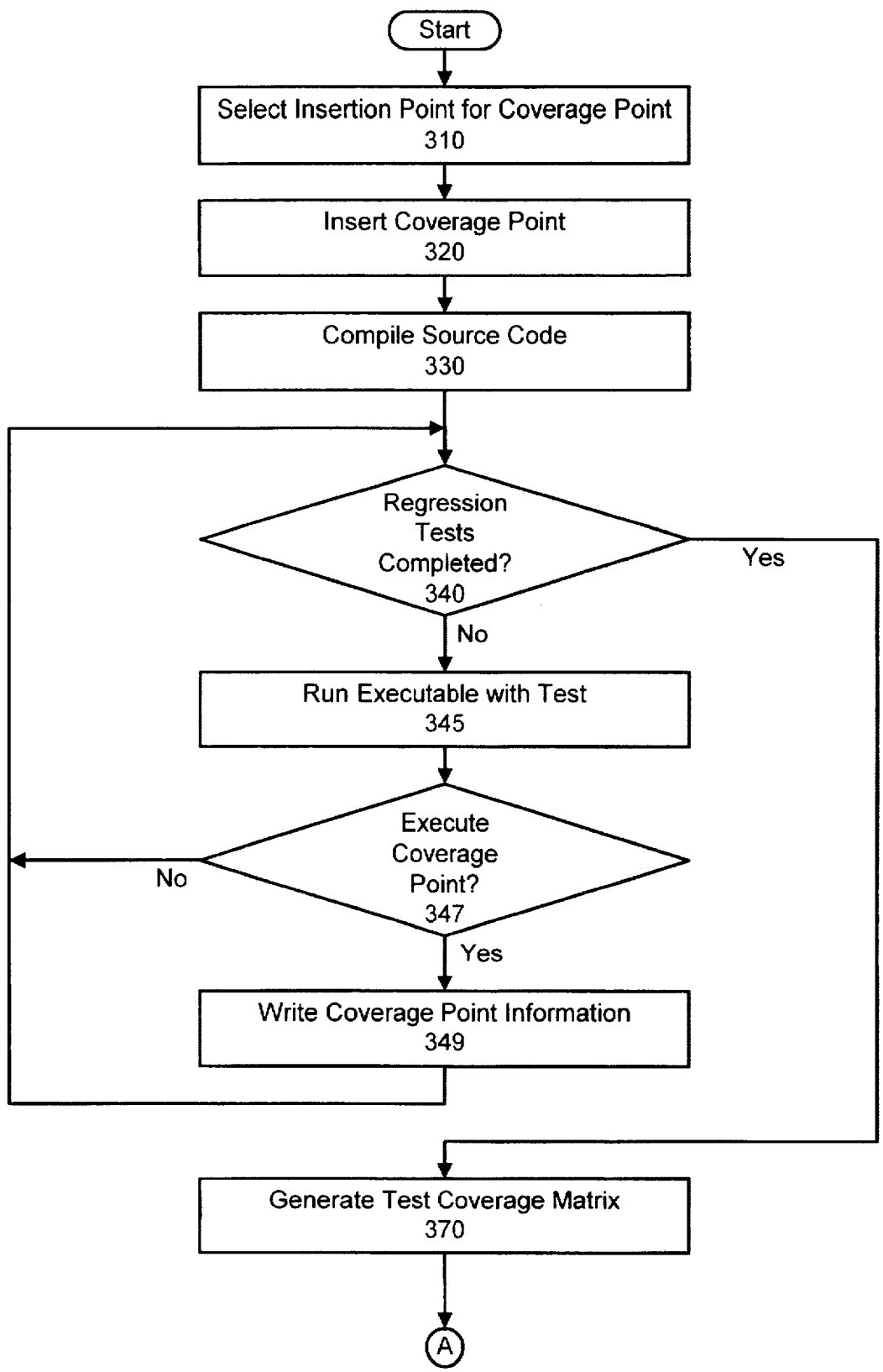
FIG. 3a/3b illustrates an embodiment of a method of using a regression testing tool.
Figure 3B:
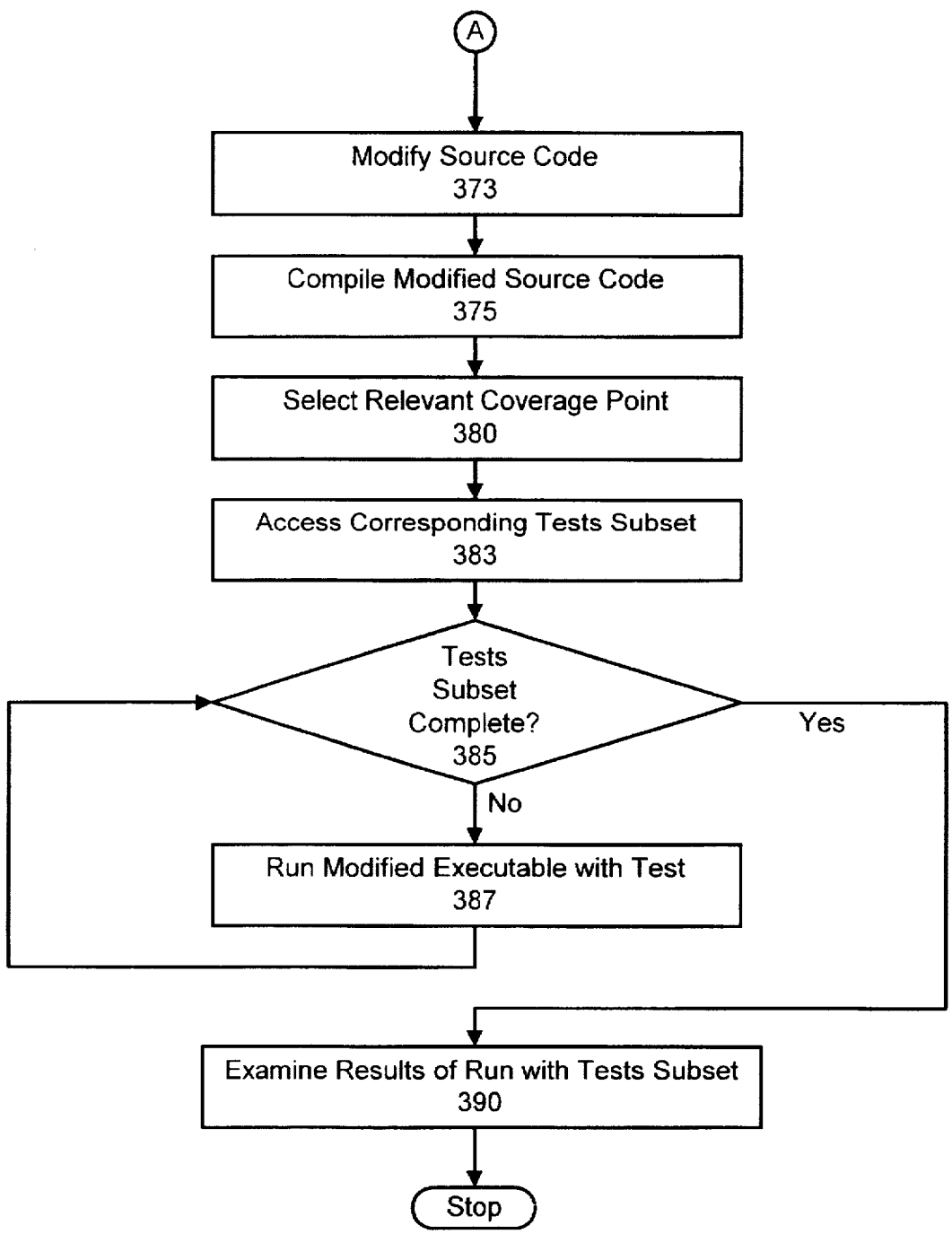

FIG. 3a/3b illustrates an embodiment of a method of using a test coverage tool 250. This embodiment can be executed on the computer system 100 of FIG. 1. In one embodiment, the steps are executed by the processor 109 in conjunction with the memory 104.

To start with, it is desirable that all the regression tests in the regression test storage 223 pass before generating any coverage point information. This is desirable because then the programmers know that all the statements in the his/her source code, that can possibly be executed, will be executed when the entire regression tests are run. If a test fails, it is likely that some of the statements in the program will not be executed.

At step 310, the programmer N 203 selects an insertion point for a coverage point. That is, the programmer N 203 determines that a particular statement, or set of statements, in the modified source code N 213 are of interest. The step 310 differentiates one embodiment of the invention from previous methods. In this embodiment, the data coverage information is obtained on a "by demand" basis. That is, the coverage information is produced for only the coverage points selected by the programmer. Previous methods often overloaded the programmer with information because they processed the entire program. Different programmers may want to insert coverage points at different places for different reasons. For example, a quality assurance engineer may want to systematically insert coverage points to determine how much of the source code is tested by the regression tests. However, a programmer may want to insert a coverage point at the entry points to his/her code, to determine which tests test only his/her code. Thus, one embodiment has the advantages of producing coverage information explicitly desired by a programmer and no more.

In another embodiment, the step 310 can be partially automated by, for example, selecting an insertion point at the beginning of every function.

In one embodiment, the programmer selects an insertion point by placing the cursor at a place in the source code and inserting the text for the coverage point 155. Of course, this task can be performed any number of ways, such as by using a search and replace function in a text processor.

At step 320, a coverage point 155 is inserted into the modified source code N 213. In one embodiment, a coverage point 155 can be inserted as a C macro, such as COVERAGE_POINT("<IDENTIFIER_STRING>"). For example:

```
...
before_statement
COVERAGE_POINT("my_coverage_point");
next_statement
...
```

The macro is preprocessed into the following C source code:

```
...
before_statement
{static int previously_executed_my_coverage_point = false;
    if(!previously_executed_my_coverage_point)
    {
        coverage_point_output("my_coverage_point");
        previously_executed_my_coverage_point = true
    }
}
next_statement
...
```

This C source code translates into the following assembler pseudocode. This pseudocode is representative of the object code of the executable 220.

```
...
before_statement
CMP    CP,1
```

```
             BRA   SKIP
                   (coverage_point_output function)
                   MOVE  1,CP
             SKIP  next_statement
                   ...
```

This coverage point source code causes a coverage point output function to be called the first time the coverage point is executed. Note importantly, in one embodiment, this information is written only once per execution of a coverage point 155. That is, even though a test 167 may execute a coverage point 155 multiple times, only one entry is generated in the test coverage data 235. This greatly reduces the amount of information written to the test coverage matrix storage 240. Also note that the coverage point 155 above has only one branch statement to be executed, once the coverage point 155 has been executed the first time. This reduces the impact on the execution time of the executable 220 while being run by the regression test tool 230.

In one embodiment, it is an advantage to insert the coverage point directly into the source code. In particular, where the source code undergoes more than one translation before becoming the object code, inserting the coverage point directly into the source code is particularly advantageous. For example, if the source code includes VHDL, the VHDL may first be compiled into an intermediate form such as C source code. The C source code may then be compiled into the executable 220. To perform object code insertion on the executable 220 would provide coverage information about the C source code, but apparently not about the VHDL source code. Therefore, one embodiment of the invention allows the programmer to determine whether a test covered one of the programmer's source code statements, and not only a statement in an intermediate form of the program.

Next at step 330, the compiler 215 compiles the source code with the coverage point 155 in it. Compiling the source code involves translating the source code from one language to another. Typically, this involves translating a high level language, such as C or C++, into object code. Aho, Alfred V., "Compilers, Principles, Techniques, and Tools," Addison-Wesley (Menlo Park, Calif.: 1986) describes compilers. The step 330 creates the executable 220.

At step 340, the regression test tool 230 tests to determine whether all the tests 272 have been run. If not, then step 345 through step 349 are performed. If yes, then step 370 is performed. Step 345 through step 349 can be performed nightly using the source code in the released source code library 270.

At step 345, the executable 220 is run with a test from tests 272. Step 347 represents the test made in a coverage point in the executable 220. If a coverage point is not executed, this step will never be executed. If the coverage point test is executed, then step 349 is performed.

In step 349, the coverage point information is output. This step corresponds to the call to the coverage point output function noted above. In one embodiment, the coverage point information is a print statement which prints the name of the coverage point. The coverage point can be correlated with the tests 272 (which test exercised which coverage point) by the test coverage tool 250. The coverage point information corresponds to the test coverage data 235. In one embodiment, the test coverage data 235, and the matrix information 242, have the following format. This format is a file that contains two type of lines:

Coverage point definitions: These start with a # sign and will have a column number and the coverage point name in them.

Test Coverage: <status><test><coverage>.

<status> is a status word which is one of UCOV=no coverage point has been executed, PASS=the test passed, FAIL=the test failed, ERRO=a regression test tool 230 failure.

<test> is the name of the test in the usual regression test tool 230 format e.g., directory_name testname.

<coverage> is a string of spaces and *s which indicate the coverage.

Figure 4:
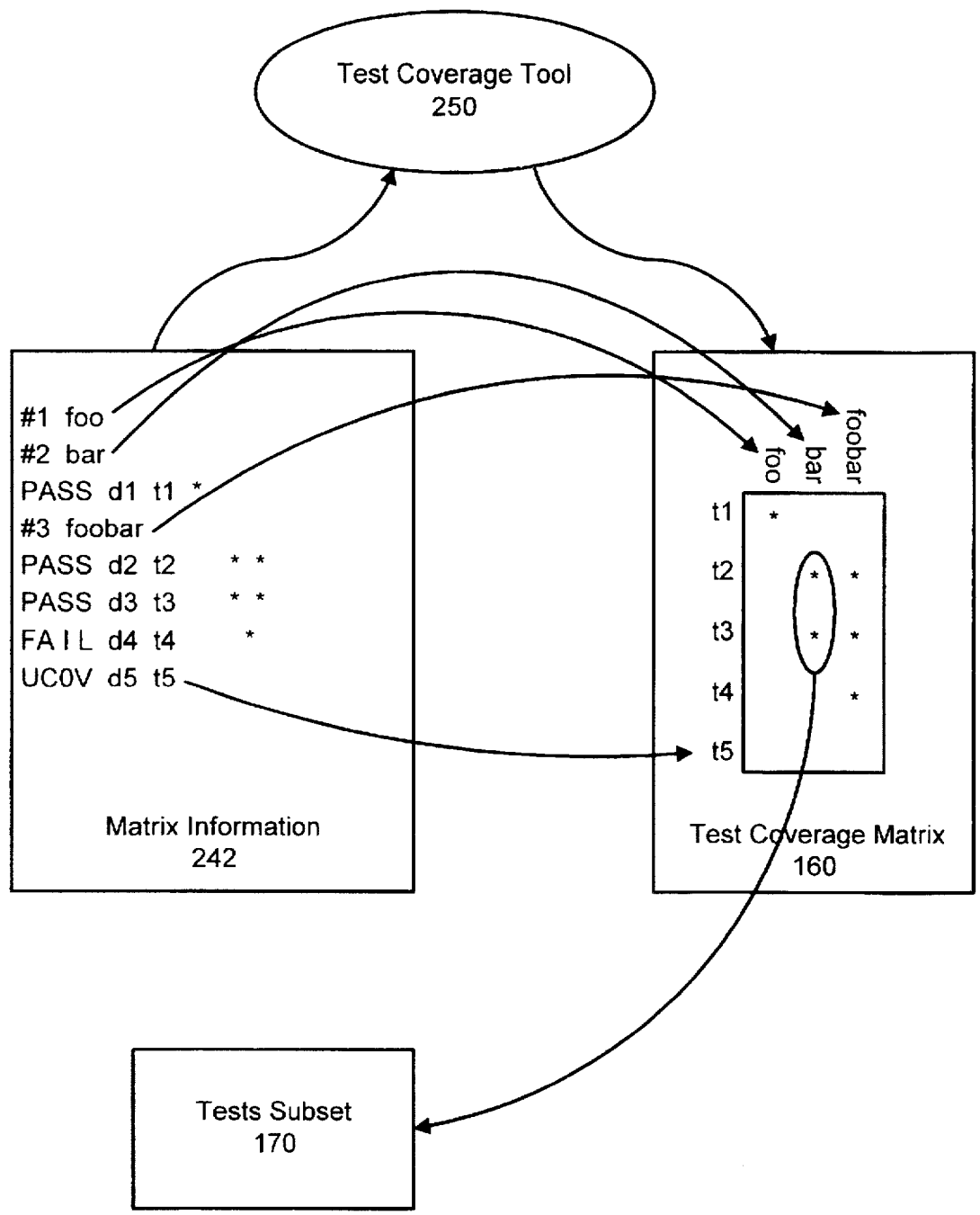
FIG. 4 illustrates an example test coverage matrix.

FIG. 4 illustrates an example that uses the matrix information 242 to build a test coverage matrix 160.

Note that importantly, no time consuming post-processing of the object code (executable 220) is needed to generate the coverage point information.

In one embodiment, the test coverage tool 250 does not detect coverage points that are not exercised by any of the tests 272. This is because those coverage points would not have had an opportunity to print themselves. However, in one embodiment, the test coverage tool 250 accesses the released source code library 270 searching for the coverage points in the source code. The test coverage tool 250 then makes a list of the coverage points. In this way, the test coverage tool 250 can find coverage points that are not exercised by any of the tests and can include this information in the test coverage data 235.

Once all the regression tests have been run step 370 is performed. At step 370, the test coverage matrix 160 is generated. This involves using the test coverage data 235, or the matrix information 242, to generate the test coverage matrix 160. In one embodiment, the coverage point names 165 are written across the top of the test coverage matrix 160 (corresponding to the matrix columns). At the beginning of the rows are the test names 169. In one embodiment, an * indicates that particular test from the regression test tool 230 executed a particular coverage point. The Perl scripts in table 1 illustrate one embodiment of a method of generating a test coverage matrix 160 from the test coverage data 235. For more information on Perl see Larry Wall and Randal L. Schwartz, "Perl," O'Reilly & Associates, Inc., 1991.

TABLE 1

```
tcm-defaults
# RegressionTestBuilder executable.

$ gRegressionTestBuilder = "/src/syn/tools/dvtools/bin-
sun4/RegressionTestBuilder;
# This file is used to store the regression test name as input
# for RegressionTestBuilder. The file gets created and deleted for every
# test.

$gWrapList    = "/tmp/wrap-list-$$";
# Filename which passed to the test executable using the -tcm option.
# The test executable writes the list of coverage points into this
# file. The script 'tcm-create' deletes the file after every run of
# the test executable.

$gCoverList   = "/tmp/cover-list-$$";
# Filename for the TCM output file. Created by tcm-create. For
# historic reasons, this symbol is called TFMatrix (for Test/Function
# Matrix).

$gTFMatrix    = "./tcm.$$";
# Formatting variables: gNameSize restricts the size of a regression
# test to this many chars. gLeadChars leaves that much space in front
# of the test name, so that the status (PASS, FAIL, ...) can be printed

$gNameSize   = 74;
$gLeadChars  = 5;
-----------------------------------------------------
tcm-create
require "tcm-defaults";
require "getopts.pl";
$nFunctions = 0;
```

TABLE 1-continued

```
$nLines = 0;
# Process the command line flags

&Getopts( 'o:f:S:s:' );
if( $opt_f ) {                  # Extra flags passed to Regression
Test Builder
        $gExtraSWOptions = $opt_f;
}
if( $opt_o ) {                  # TCM file name (instead of default)
        $gTFMatrix = $opt_o;
}
if( $opt_S ) {                  # Executable
        $gSim = $opt_S;
}
if( $opt_s ) {                  # Extra Executable flags (besides-tcm)
        $gSimFlags = $opt_s;
}
$gSWOptions = join( ' ', $gExtraSWOptions,
        "-f\"EXECUTABLE=\"$gExe -tcm $gCoverList
        $gExeFlag\"\" " );
# This file will contain the TF Matrix after we're done

open( TFMATRIX, ">$gTFMatrix" );
# Loop over all tests in the input list

while( <STDID> ) {
        chop;                   # Get rid of newline.
        $nLines++;
        local( $test ) = $_;
        # Write the name of the test into a Regression Test Builder file
        #
        open( OUTFILE, ">$gWrapList" );
        print OUTFILE "$test\n";
        close OUTFILE;
        # Run the test.
        #
        system( "rm -f $gCoverList" );
        system( "$gRegressionTestBuilder $gSWOptions -i
        $gWrapList" );
        system( "rm -f $gWrapList" );
        # Check what the coverage tells us and put it into the main
        # Test/Function matrix. Regression Test Builder returns 0 on
        # success, 1 on user error, 2 on failure.
        #
        if( $? == 0 ) {
                if( open( COVERFILE, "<$gCoverList" ) ) {
                        while( <COVERFILE> ) {
                                local( $f ) = $_;
                                # find the position $k
                                # which represents the function $f
                                if( $function{$f}>0 ) {
                                        $k = $function{$f};
                                } else }
                                        $nFunctions++;
                                        $function{$f} = $nFunctions;
                                        $k = $nFunctions;
                                        print TFMATRIX "# $k $f";
                                }
                                # Now mark the place
                                # in the line of the TF matrix
                                $coverage{$k} = 1;
                        }
                        close( COVERFILE );
                        print TFMATRIX "PASS ";
                        system( "rm -f $gCoverList ");
                } else {
                        print TFMATRIX "UCOV ";
                }
        } else {
                if( $? == 1 ) {
                        print TFMATRIX "ERRO ";
                } else {
                        print TFMATRIX "FAIL ";
                }
        }
}
# Write out the line of the TF matrix

printf TFMATRIX "%-${gNameSize}s ", $test;
for ( $j = 1; $j<=$nFunctions; $j++ ) {
```

TABLE 1-continued

```
        if( $coverage{$j}==1 ) {
                print TFMATRIX "*";
                $coverage {$j} = 0;
        } else {
                print TFMATRIX " ";
        }
        }
        printf TFMATRIX "\n";
}
# We're done, lets clean up

clean( TFMATRIX );
exit;
```

In one embodiment, the matrix information 242 is generated using hypertext markup language (HTML) tags. Thus the test coverage matrix 160 can be viewed and accessed by anyone having a HTML viewer. The test coverage tool 250 can be used directly by the HTML viewer. Any of the programmers can access the test coverage matrix 160 using NetScape™, available from NetScape of Mountain View, Calif., or Mosaic, available from the NCSA.

Next, at step 373, a programmer modifies the source code and notes a coverage point 155 that will execute with the changes. Of course, each programmer can modify his/her own source code. Each of the programmers benefit from the test coverage matrix 160.

At step 375, the modified source code is then compiled to generate the modified executable 220.

At step 380, the programmer provides the test coverage tool 250 with the particular coverage point 155 noted in step 373.

At step 383, the test coverage tool 250 accesses the test coverage matrix storage 240. The test coverage tool 250 identifies the tests subset from the matrix information 242. In one embodiment, the Perl script of table 2 is used to extract the test names 253 that the coverage point identified by the coverage point selection 252.

TABLE 2

```
tcm-grep            1
require "tcm-defaults";
$lineLength = $gNameSize + $gLeadChars;
# Get the command line arguments and build up a mask
# array, which will be used to select the appropriate
# columns.

for( $i = 0; $i<=$#ARGV; $i++ ) {
        $mask[$i] = $ARGV[$i];
}
$nCols = $#ARGV + 1;
# Now do the actual work and extract all the lines, that
# cover the coverage points specified in the coverage
# mask

while( <STDIN >) {
        if( length( $_ )>$lineLength ) {
                $linestr = substr( $_, $lineLength );
                @line = split( //, $linestr );
                $found = 0;
                for( $i = 0; $i<$nCols && $found==0; $i++ ) {
                        if( $line[$mask[$i]] eq "*" ) {
                                print substr( $_, $gLeadChars, $gNameSize ), "\n";
                                $found = 1;
                        }
                }
        }
}
```

At step 385 the regression test tool 230 is provided the test names 253.

The step 385 and step 387, all the tests referenced by the test names 253 are used as input to the executable 220. At step 387, the regression test tool 230 accesses a test from the regression test storage 223. The regression test tool 230 runs the modified executable 220 using the accessed test and generates the corresponding test results 231.

Once all the tests referenced by test names 253 are run, a programmer can examine the test results 231. The results will indicate which of the regression tests that execute his/her modified source code passed or failed. Thus, one embodiment has the advantage of integrating the test coverage matrix 160 with the regression test tool 230.

The test coverage tool 250 can also provide other information to the programmer. For example, in one embodiment, the test coverage tool 250 generates a test coverage report and a list of all the coverage points. The test coverage report indicates the number of tests 272 run, the number of test that failed, the number of tests 272 that passed, the number of tests 272 that did not exercise any coverage points (uncovered tests), and any tests that failed to be executed during the regression tests. Table 3 illustrates a Perl script that can be used to generate such a report.

TABLE 3

```
tcm-report      1
$nCover = 0;
$maxLength = 0;
while( <> ) {
        /^PASS/    && $nPassedTests++;
        /^FAIL/    && $nFailedTests++;
        /^UCOV/    && $nUncoveredTests++;
        /^ERRO/    && $nRegressionTestBuilderErr++;
        if( /^\# ([0-9]+) (.+)/ ) {
                $functions{$1} = $2;
                if( $1>$nCover ) {
                        $nCover = $1;
                }
                if( length( $2 )>$maxLength ) {
                        $maxLength = length( $2 );
                }
                next.
        }
        $nTests++;
}
print "List of Coverage Points\n";
print "-----------------------\n";
for( $i = 1; $i<=$nCover; $i++ ) {
        printf( "%4d %s\n", $i, $functions{$1} );
}
print "\nOverall Regression Performance\n";
print "------------------------------\n";
printf( "%4d tests ran.\n", $nTests );
printf( "%4d tests failed.\n", $nFailedTests );
printf( "%4d tests passed.\n", $nPassedTests );
printf( "%4d uncovered tests.\n", $nUncoveredTests );
printf( "%4d RegressionTestBuilder failures.\n",
$nRegressionTestsBuilderErr );
```

As noted above, in one embodiment, the test coverage matrix 160 has the test names 169 down the sides and coverage point names 165 across the top. However, in another embodiment, the test coverage tool 250 allows the programmer to transpose the test coverage matrix 160. As with the original test coverage matrix 160, a transposed test coverage matrix can be associated with HTML tags and viewed using a HTML viewer. Table 4 illustrates a Perl script that transposes the test coverage matrix 160.

TABLE 4

```
tcm-transpose     1
require "tcm-defaults";
# Go through all the files that were supplied as
# command line arguments.
```

TABLE 4-continued

```

while( <> ) {
        if( /^\# ( [0-9]+) (.*)/ ) {   # New column definition
                $CTM[$nCols] = "$2 # ";
                $nCols++;
        } else {
                if( /^PASS ([^ ]+) ([^ ]+[ ]+)/ ) {  # A line of the matrix
                        # Make this a column definition
                        # in the transposed matrix
                        $nRows++;
                        print "# $nRows ", substr( $_, 0, $gNameSize +
                        $gLeadChars );
                        print "\n";
                        # Record the transposed line in the CTM
                        #
                        $stars = substr( $_, $gNameSize + $gLeadChars +
                        1);
                        chop $stars;
                        @s = split( / /, $stars );
                        for( $j = 0; $j<=$#s; $j++ ) {
                                if( $s[$j] eq "*" ) {
                                        $CTM[$j] .= $nRows ";
                                }
                        }
                }
        }
}
for( $i = 0; $i<$nCols; $i++ ) {
        printf( "%4d ", $i );
        print "$CTM[$i]\n";
}
```

In one embodiment, the regression testing is performed on a number of computer system 100s attached to a network. Each computer system 100 has its test coverage matrix storage 240. These test coverage matrixes can be merged. Table 5 illustrates a Perl script that can be used to merge multiple test coverage matrixes 160 into one large matrix.

TABLE 5

```
tcm-merge     1
require "1-defaults";
# Go through all the files that were supplied as
# command line arguments.

for( $i = 0; $i<=$#ARGV; $i++ ) {
        open( INPUTFILE, "<$ARGV[$i]" );
        while( <INPUTFILE> ) {
                if< /^\# ([0-9]+) (.*)/ ) {   # Coverage point
                        if( $function{$2}==0 ) {   # Is it a new coverage point?
                                $nFunctions++;
                                $function{$2} = $nFunctions;
                                print "# $nFunctions $2\n";
                        }
                        # Set the translation relation for column $1.
                        #
                        $translate[$1-1] = $function{2};
                } else {
                        if( /([A-Z]+) ([^ ]+) ([^ ]+[ ]+)/ ) {  # A test line
                                # Translate the columns to the new coverage matrix
                                #
                                $stars = substr( $_, $gNameSize + $gLeadChars +
                                1 );
                                chop $stars;
                                @inCoverage = split( / /, $stars );
                                for( $j = 0; $j<=$#inCoverage; $j++ ) {
                                        if( $inCoverage[$j] eq "*" ) {
                                                $outCoverage{$translate[%j]} = 1;
                                        }
                                }
                                # Write out a line in the new coverage matrix
                                #
                                print substr( $_, 0, $gNameSize + $gLeadChars +
                                1 );
                                for( $j = 1; $j<=$nFunctions; $j++ ) {
```

TABLE 5-continued

```
        if( $outCoverage{$j}==1 ) {
            print "*";
            $outCoverage{$j} = 0;
        } else {
            print " ";
        }
    }
    print "\n";
    } else {              # Some other line in the TFM, copy it
        print $_;
    }
  }
}
# Clear our translation table for this input file.

for( $j = 1; $j<=$#translate; $j++ ) {
    $translate[$j] = 0;
}
# We're done with this input file

close( INPUTFILE );
}
```

What is claimed is:

1. A method of testing a computer program in a computer system, said computer system including a first source code version of said computer program, and a plurality of tests, said method comprising the steps of:

inserting a first coverage point into said first source code version, said first coverage point identifying a first statement in said first source code version;

testing said first source code version of said computer program using said plurality of tests to generate a first result;

using said first result, generating a first tests subset of said plurality of tests that executed said first coverage point and tested said first statement;

modifying said first source code version of said computer program to produce a second source code version of said computer program; and testing said second source code version of said computer program using said first tests subset.

2. The method of claim 1 wherein said inserting said first coverage point includes:

editing said first source code version to insert said first coverage point, where said first coverage point includes a coverage point identifying statement.

3. The method of claim 1 wherein said first source code version includes a plurality of hardware description language statements and wherein said inserting said first coverage point into said first source code version includes:

inserting said first coverage point into said plurality of hardware description language statements.

4. The method of claim 1 said computer system includes a first computer and a second computer, said first computer being different than said second computer, and wherein said method further comprises:

said first computer compiling said first source code version into a first executable; and wherein said testing said first source code version of said computer program is performed by said second computer executing said first executable.

5. The method of claim 1 said computer system includes a first computer and a second computer, said first computer being different than said second computer, and wherein said method further comprises:

said first computer compiling said first source code into a first executable; and wherein said testing said first source code version of said computer program is performed by said second computer executing said first executable.

6. The method of claim 1 wherein said first coverage point includes an output statement and wherein said testing said first source code version of said computer program includes:

executing said output statement a first time resulting in a first coverage point indicator to be output to said first result.

7. The method of claim 6 wherein said executing said first source code version of said computer program includes:

executing said output statement a second time and not resulting in a second coverage point indicator being output to said first result.

8. The method of claim 1 wherein said first statement is a function and wherein said inserting said first coverage point includes:

inserting said first coverage point inside of said function.

9. The method of claim 1 wherein said first statement is a loop and wherein said inserting said first coverage point includes:

inserting said first coverage point in front of said loop.

10. The method of claim 1 wherein said using said first result, generating said first tests subset of said plurality of tests that executed said first coverage point and tested said first statement includes:

accessing said first result to generate a plurality of tests names, each test name of said plurality of tests names corresponding to a test of said plurality of tests that exercised said first statement.

11. A computer comprising:

a memory for storing
    a source code version of a computer program having a plurality of statements and a plurality of coverage points, each coverage point of said plurality of coverage points corresponding to a statement of said plurality of statements, and
    a plurality of tests; and a processor for executing
    a regression test tool, said regression test tool having a computer program input and a regression tests results output and a test coverage output, said test coverage output identifying which tests of said plurality of tests executed which coverage points of said plurality of coverage points, and
    a test coverage tool having a test coverage input, a coverage point selection input, and a tests subset output, said tests subset output outputting a first tests subset to said regression test tool in response to receiving a first coverage point selection.

\* \* \* \* \*